(12) United States Patent
Waldner et al.

(10) Patent No.: US 10,106,985 B1
(45) Date of Patent: Oct. 23, 2018

(54) COUPLING BETWEEN SLAB BOLSTER ELEMENTS

(71) Applicant: Better Air Manufacturing Ltd., MacGregor (CA)

(72) Inventors: Glendon Waldner, MacGregor (CA); Daniel Waldner, MacGregor (CA); Philip Waldner, MacGregor (CA)

(73) Assignee: Better Air Manufacturing Ltd., MacGregor, MB (CA)

( * ) Notice: Subject to any disclaimer, the term of this patent is extended or adjusted under 35 U.S.C. 154(b) by 0 days.

(21) Appl. No.: 15/830,735

(22) Filed: Dec. 4, 2017

(51) Int. Cl.
*E04C 5/16* (2006.01)
*E04C 5/20* (2006.01)
*E01C 11/18* (2006.01)

(52) U.S. Cl.
CPC ............. *E04C 5/20* (2013.01); *E04C 5/168* (2013.01); *E01C 11/18* (2013.01); *Y10T 24/45529* (2015.01); *Y10T 403/7039* (2015.01)

(58) Field of Classification Search
CPC . E04C 5/20; E04C 5/168; E01C 11/18; Y10T 24/45524; Y10T 24/45529; Y10T 403/4694; Y10T 403/7039
USPC .......... 52/677, 678, 614, 615; 403/326, 330, 403/325, 329, 321; 24/614, 615
See application file for complete search history.

(56) References Cited

U.S. PATENT DOCUMENTS

| | | | | |
|---|---|---|---|---|
| 2,278,917 A | * | 4/1942 | Curry ..................... | E01C 11/14 404/136 |
| 3,409,858 A | * | 11/1968 | Krehbiel ................ | H01R 13/62 174/138 F |
| 4,224,786 A | * | 9/1980 | Langlie .................... | A01D 7/00 403/361 |
| 4,272,145 A | * | 6/1981 | LaDuke ............. | H01R 13/6272 439/358 |
| 4,646,371 A | * | 3/1987 | Nowell ................ | A47C 19/005 403/361 |
| 4,801,275 A | * | 1/1989 | Ikeda ................. | H01R 13/6272 439/350 |
| 4,890,972 A | * | 1/1990 | Nekola ................... | B60P 3/125 280/402 |
| 5,104,253 A | * | 4/1992 | Zielinski ............ | H01R 13/6272 403/329 |
| 5,463,912 A | * | 11/1995 | Inoue ............... | H01R 13/62938 403/321 |
| D393,997 S | * | 5/1998 | Hartzheim ..................... | D8/354 |

(Continued)

*Primary Examiner* — Brent W Herring
(74) *Attorney, Agent, or Firm* — Adrian D. Battison; Ade & Company Inc.; Ryan W. Dupuis

(57) ABSTRACT

Two slab bolster elements having rails supported on legs for carrying rebar during casting are connected end to end by a blade for sliding longitudinally of the rail into a female receptacle and a releasable locking mechanism which acts to lock the blade in the female receptacle. The locking mechanism comprises a notch on one side surface of the blade and a projecting portion of the female receptacle engaged into the notch. The projecting portion is carried on the female receptacle by a portion which can flex to cause the projecting portion to move away from the side surface of the blade. The female receptacle includes a manually depressible member on a side of the female receptacle opposite the projecting portion which when depressed provides motion toward the female receptacle which causes the projecting portion to move out of the notch.

10 Claims, 5 Drawing Sheets

(56) References Cited

U.S. PATENT DOCUMENTS

| | | | | |
|---|---|---|---|---|
| 5,803,651 | A * | 9/1998 | Saito | H01R 13/641 403/11 |
| 6,059,598 | A * | 5/2000 | Yamashita | H01R 13/6272 403/326 |
| 6,146,183 | A * | 11/2000 | Jinno | H01R 13/6272 439/358 |
| 6,669,398 | B2 * | 12/2003 | Wada | C08J 9/0004 403/322.4 |
| 6,772,571 | B1 * | 8/2004 | Sorkin | E04O 5/20 52/677 |
| 6,775,954 | B1 * | 8/2004 | Sorkin | E04O 5/167 52/686 |
| 7,252,530 | B2 * | 8/2007 | Shamoto | H01R 13/641 439/352 |
| 7,284,354 | B1 * | 10/2007 | Sorkin | E04O 5/20 404/134 |
| 7,290,313 | B2 * | 11/2007 | Southern | A44B 11/266 24/587.12 |
| 7,373,764 | B1 * | 5/2008 | Sorkin | E04O 5/20 404/134 |
| 7,513,020 | B2 * | 4/2009 | Giampavolo | A44B 11/2573 24/615 |
| 7,775,010 | B2 * | 8/2010 | Lee | E04O 5/20 24/615 |
| 2005/0210641 | A1 * | 9/2005 | Giampavolo | A44B 11/2573 24/615 |
| 2006/0090309 | A1 * | 5/2006 | Southern | A44B 11/266 24/614 |
| 2008/0184656 | A1 * | 8/2008 | Lee | E04O 5/20 52/688 |

* cited by examiner

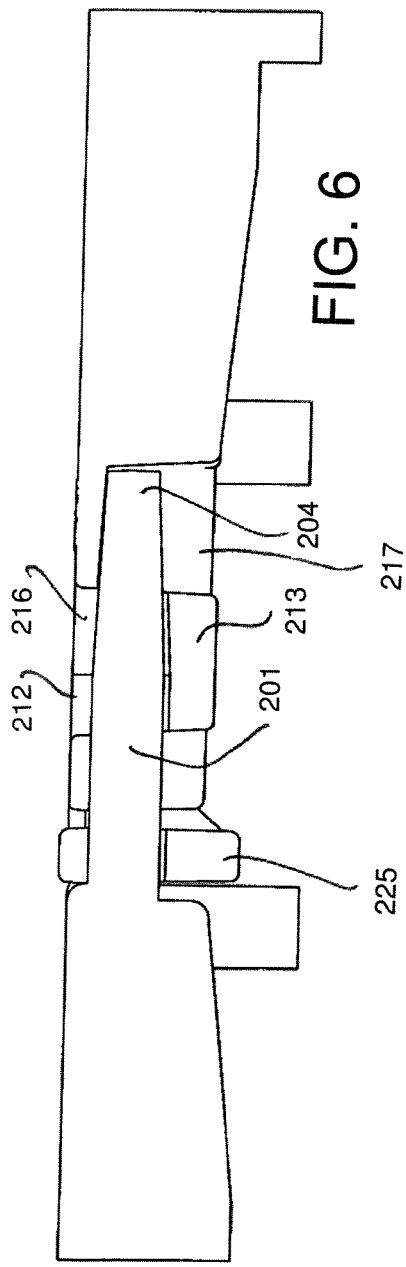
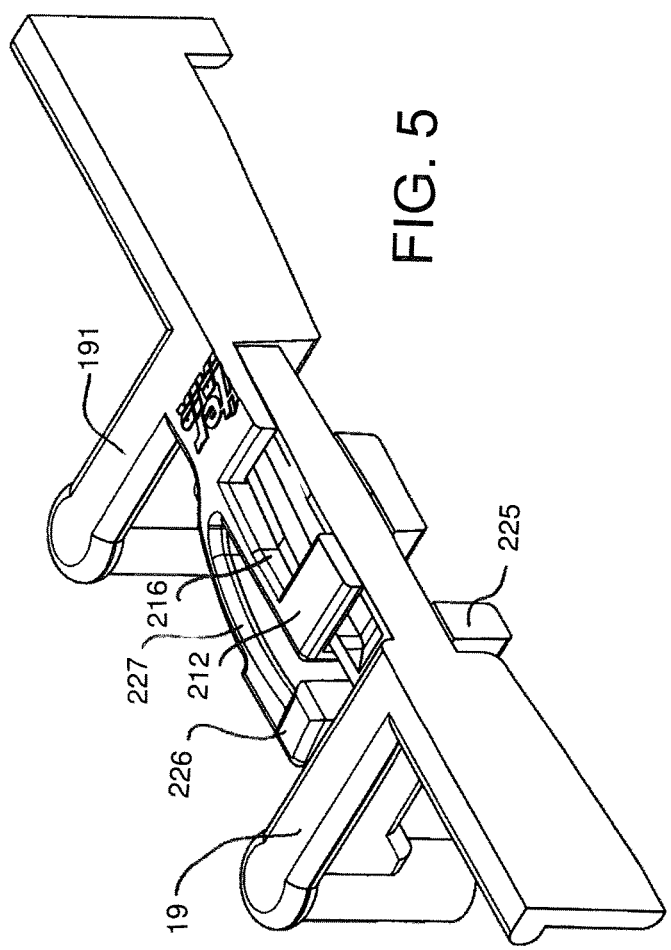

COUPLING BETWEEN SLAB BOLSTER ELEMENTS

This invention relates to a slab bolster elements of the type having an injection molded frame defining a rail for supporting reinforcing bars laid across the rail and a plurality of legs for supporting the rail at a position spaced from a support surface so that a filler material laid on the support surface covers the reinforcing bars and the rails, and particularly to a coupling having a male coupling at one end of one element for connection to a female coupling at an end of the frame of a second bolster element.

Typically in such arrangements, the male coupling has a blade projecting longitudinally of the rail for sliding into a female receptacle of the female coupling and there is provided a locking mechanism which acts to lock the blade in the female receptacle to hold the first and second elements together in a connected position.

Slab bolsters are relatively lightweight frame members that are positioned at spaced intervals on a deck or grade within a slab form to support concrete reinforcing bar prior to the pouring of wet concrete. After placing the slab bolsters in position within the slab form, rebar may be positioned so as to extend between and across the support surfaces of parallel slab bolsters. Such slab bolsters are frequently attached to other similar bolsters in a linear relationship to form a continuous bolster extending across the width of the slab form.

SUMMARY OF THE INVENTION

It is one object of the present invention to provide a locking mechanism which is readily releasable to allow the elements to move apart.

According to the invention there is provided slab bolster elements having a coupling for connection of two of the slab bolster elements end to end comprising:

first and second slab bolster elements each having an injection molded frame defining a rail for supporting reinforcing bars laid across the rail and a plurality of legs for supporting the rail at a position spaced from a support surface so that a filler material laid on the support surface covers the reinforcing bars and the rails;

the rail having a top surface onto which the bars are laid and two side surfaces;

the frame of the first bolster element having a male coupling at one end for connection to a female coupling at an end of the frame of the second bolster element;

the male coupling comprising a blade projecting longitudinally of the rail for sliding into a female receptacle of the female coupling;

the first and second slab bolster elements having a locking mechanism which acts to lock the blade in the female receptacle to hold the first and second elements together in a connected position which is releasable to allow the elements to move apart;

the locking mechanism comprising a notch on one side surface of the blade of the first element and a projecting portion of the female coupling of the second element which is, in the connected position, engaged into the notch to hold the blade against movement away from the second element;

the projecting portion being carried by a flexible mounting on female coupling of the second element which can flex to cause the projecting portion to move in a direction away from the side surface of the blade out of the notch to allow the blade to move out of the female receptacle;

the female coupling of the second portion including a manually depressible member on a side of the female receptacle opposite the projecting portion which when depressed provides motion toward the female receptacle;

and the female coupling of the second portion including a connecting portion connecting the manually depressible member to the projecting portion so that the motion of the manually depressible member causes the projecting portion to move out of the notch.

Preferably the connecting portion extends underneath the blade. However it can also be located across the top of the blade.

Preferably the connecting portion is connected to the female receptacle on each side of the blade by a respective one of a pair of flexible arm portions. However the connection to the female receptacle may be on only one side.

Where it is connected on both sides, preferable the connecting portion is connected to the female receptacle on each side of the blade by a respective one of a pair of flexible arm portions.

Typically the female receptacle includes a top wall, a bottom wall and two side walls defining an open mouth into which the blade is inserted and each of the flexible arm portions extends alongside a respective one of the side walls of the female receptacle. In this arrangement preferably each of the flexible arm portions is connected to the respective side wall of the female receptacle and is inclined outwardly therefrom to the respective side.

Preferably the top wall of the female receptacle is coplanar with the top surface of the rail and in this case the connecting portion preferably forms a bar extending underneath the blade so as not to interfere with the top of the receptacle. In this case preferably the bar has an upper surface in sliding contact with the blade.

In order to ensure proper support of the rails at the connection, preferably the frame of the first bolster element includes a first cross member across the rail at the male coupling with a leg at each end of the first cross member and the frame of the second bolster element includes a second cross member across the rail with a leg at each end of the second cross member.

BRIEF DESCRIPTION OF THE DRAWINGS

FIG. 5 is an isometric view partially in cross-section of the components of FIG. 1.

FIG. 6 is a longitudinal cross sectional view of the components of FIG. 1.

DETAILED DESCRIPTION

Slab bolster elements 10 and 11 are provided with a coupling 12 for connection of two of the slab bolster elements end to end so that an end 13 of one is connected to the end 14 of the other.

Figure 4:
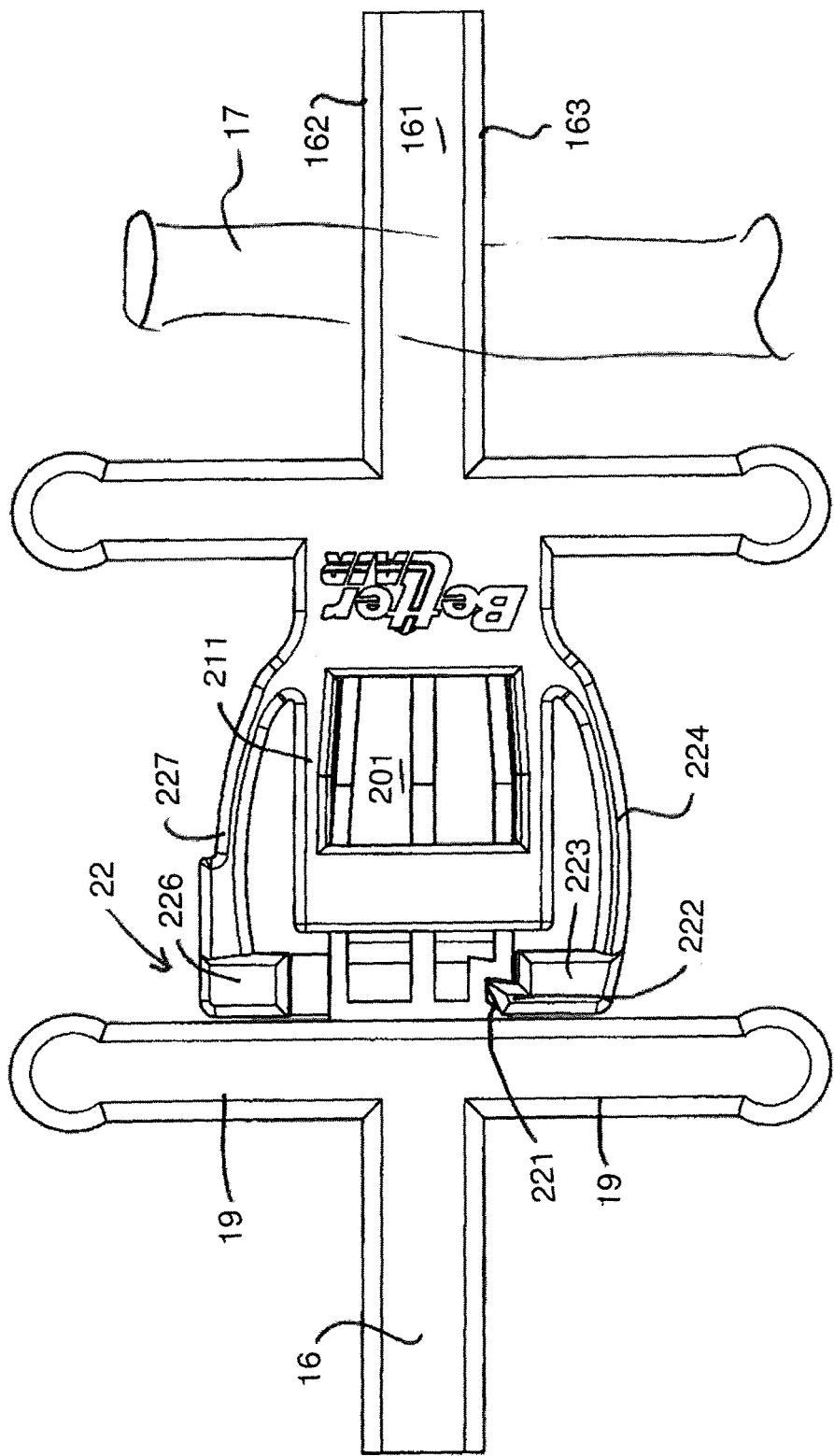
FIG. 4 is a top plan view of the components of FIG. 1.

The first and second slab bolster elements 10, 11 each have an injection molded frame 15 defining a rail 16 for supporting reinforcing bars 17 (FIG. 4) laid across the rail.

The rails are supported on a plurality of legs 18 for supporting the rail 16 at a position spaced from a support surface so that a filler material (typically concrete) laid on the support surface covers the reinforcing bars and the rails.

The rail has a top surface 161 onto which the bars 17 are laid and two side surfaces 162, 163. The legs are connected to the underside and extend downwardly to the support surface (not shown).

The frame 15 of the first bolster element 10 includes a first cross member 19 at right angles across the rail 16 of the first element on one side of the coupling 12 with a leg 181 and 182 at each end of the first cross member and the frame of the second bolster element 11 includes a second cross member 191 at right angles across the rail 16 on the other side of the coupling 12 with a leg 183, 184 at each end of the second cross member. These cross members and their supporting legs provide stability to the rails. Further such cross members can be provided at spaced positions along the rails which may be many feet in length.

The frames are formed typically by injection molding to form the rails, legs and coupling in a single molding step as an integral element.

Figure 1:
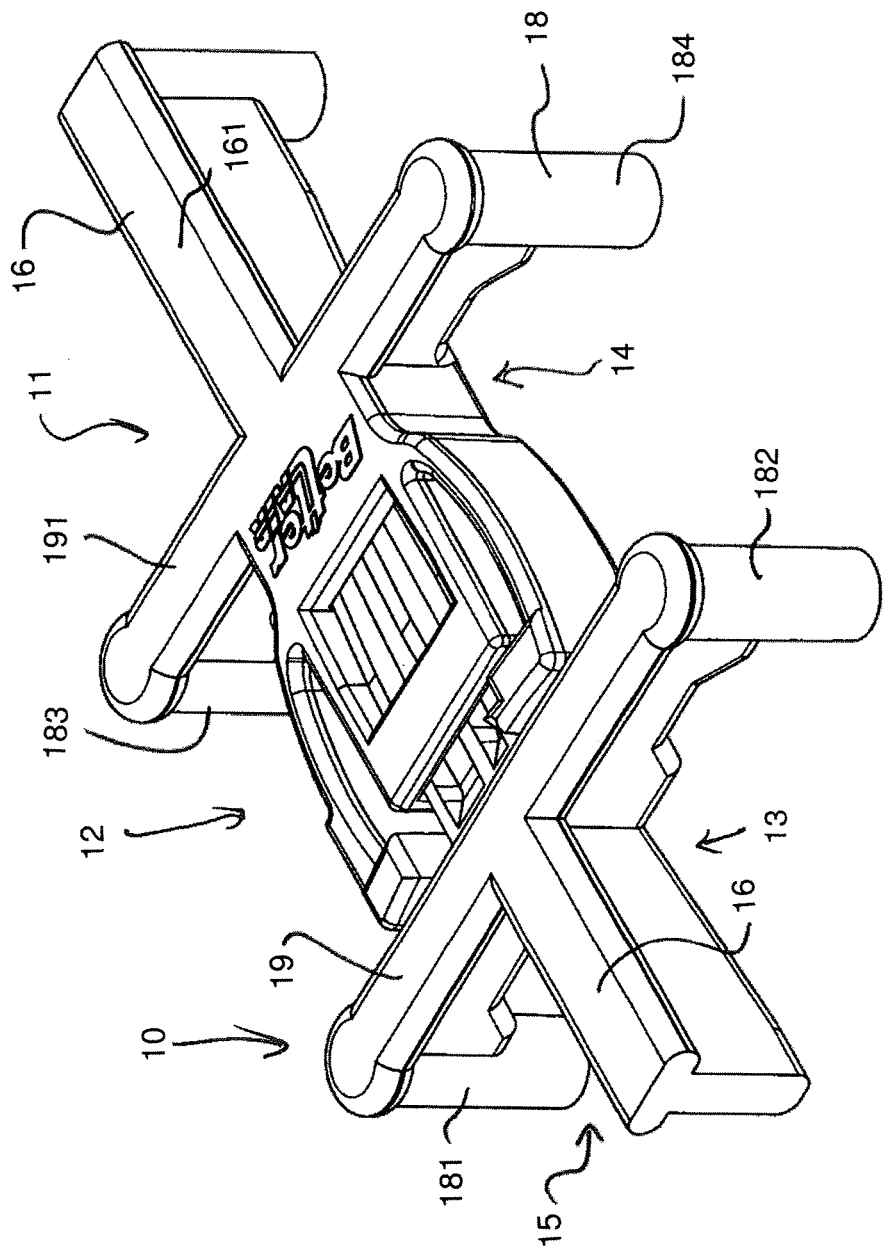
FIG. 1 is a perspective view of a slab bolster element including a connection according to the invention defined by male connector at one end and a cooperating female connector at an opposite end.
Figure 2:
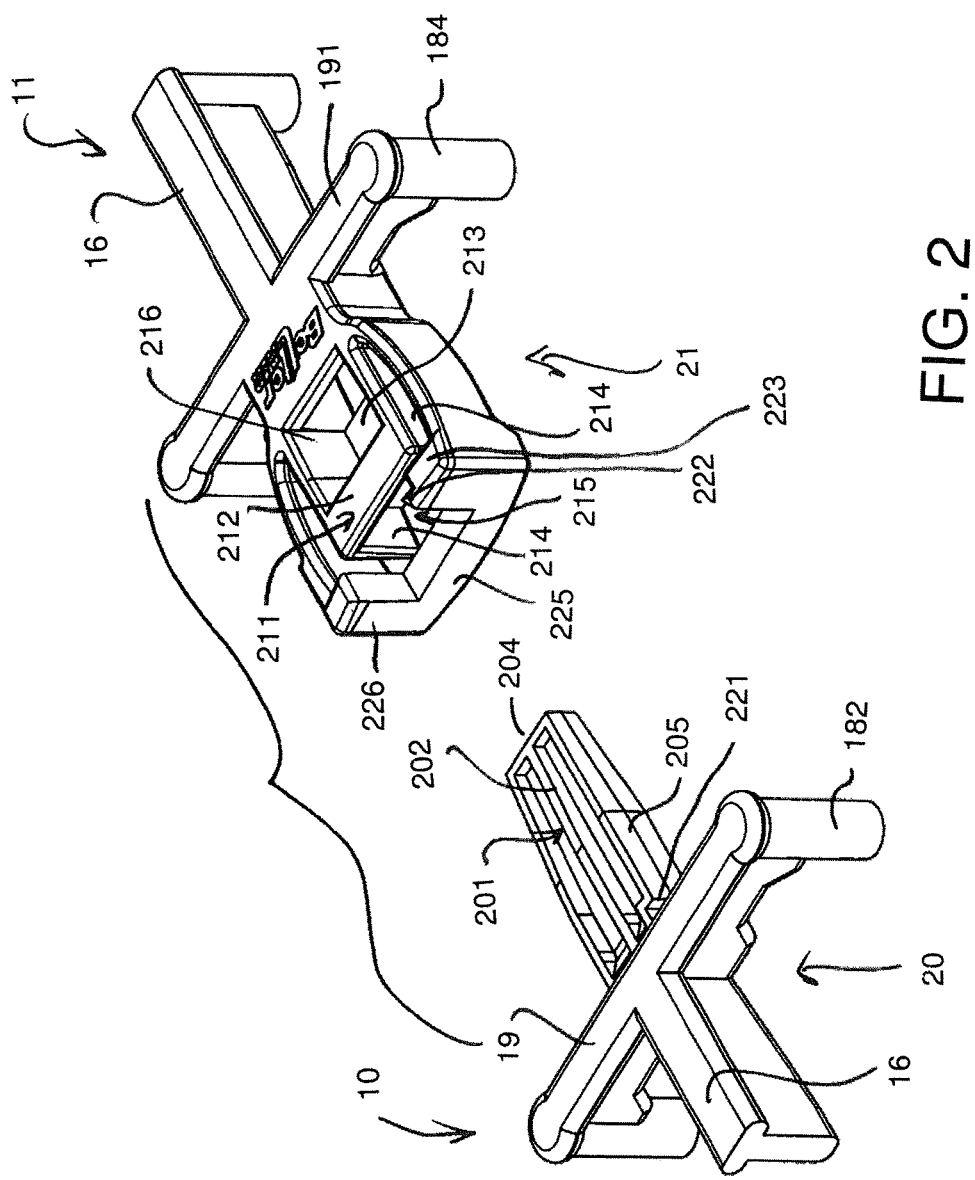
FIG. 2 is an exploded or separated isometric view of the components of FIG. 1.

The coupling 12 as best shown in FIG. 2, has a male coupling 20 at one end of the element 10 for connection to a female coupling 21 at an end of the frame of the second bolster element 11.

The male coupling 20 comprising a blade 201 projecting longitudinally of the rail for sliding into a female receptacle 211 of the female coupling 21.

The blade 201 is generally flat with a top surface 202, a bottom surface 203 two side surfaces 205 and a front end 204. The blade tapers slightly toward the front end so that it can more easily be inserted into a mouth of the female receptacle. The surfaces of the blade may be flat or may be recessed as shown to reduce material content in the molded structure.

The female receptacle 211 includes a top wall 212, a bottom wall 213 and two side walls 214 defining an open mouth 215 into which the blade is inserted and a channel along which the blade passes. The length of the receptacle is sufficient to receive the blade. The top wall 212 has a hole 216 and the bottom wall has a hole 217 so as to again reduce material content. When the blade is in the receptacle the two components act to hold the rails 16 in a common straight line.

Figure 3:
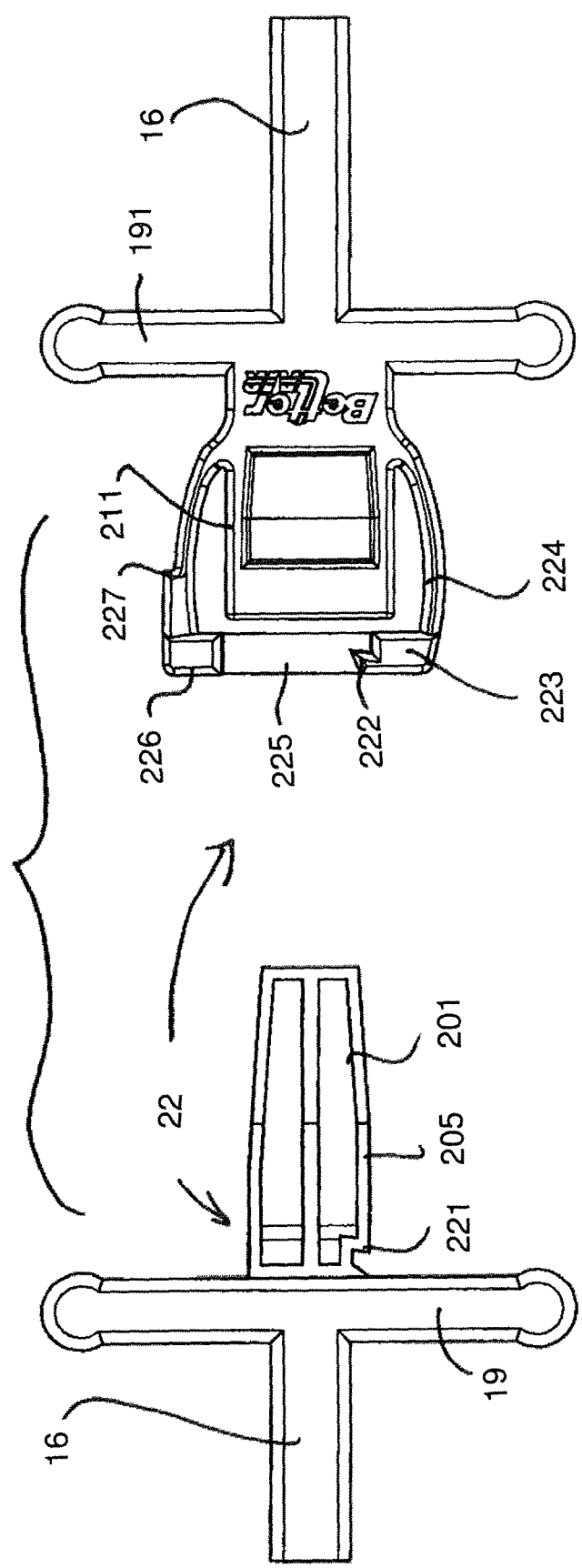
FIG. 3 is an exploded or separated top plan view of the components of FIG. 1.

A locking mechanism 22 is provided, as best shown in the plan view of FIG. 3, which acts to lock the blade 201 in the female receptacle 211 to hold the first and second elements together in a connected position. The locking mechanism 22 comprising a notch 221 formed in one side wall 205 of the blade 201 at a location on the first element immediately adjacent the cross member 19. This notch cooperates with a projecting portion or finger 222 of the female coupling of the second element which is, in the connected position shown in FIG. 4, engaged into the notch to hold the blade against movement away from the second element.

The projecting portion or finger 222 is part of a rigid generally channel shaped member defined by two side portions 223 and 226 and a cross bar 225. This member is carried by a flexible mounting member or arm 224 on one side of the female coupling 21 and on the other side by a symmetrical flexible mounting member or arm 227. The channel shaped portion is thus held at the front of the female receptacle but can flex side to side by flexing of the arms 224, 227. This flexing action causes the projecting portion 222 to move in a direction away from the side surface of the blade 201 out of the notch 221 to allow the blade to move out of the female receptacle;

The female coupling 21 also includes a manually depressible member defined by the portion 226 on a side of the female receptacle opposite the projecting portion 222 which when depressed toward the female receptacle causes the finger 222 to move out of the notch.

The female coupling also includes the bar 225 which acts as a connecting portion connecting the manually depressible member 226 to the projecting portion 222 on the support 223 so that the motion of the manually depressible member 226 causes the finger to move out of the notch.

As shown best in FIG. 2, the connecting portion or bar 225 extends underneath the blade 201 and the bar is connected to the female receptacle 211 on each side of the blade 201 by a respective one of a pair of flexible arm portions 224, 227 with each of the flexible arm portions extending alongside a respective one of the side walls of the female receptacle 211. As best shown in FIG. 3, each of the flexible arm portions 223, 227 is connected to said respective one of the side walls of the female receptacle 211 at its base and is inclined outwardly therefrom to the respective side. This structure resists upward and downward movement of the support bar 225 and the finger. Also this arrangement locates the top wall of the female receptacle so as to be is coplanar with the top surface of the rail and locates the bar extending across the blade from one side of the blade to the other with an upper surface in sliding contact with the blade.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Slab bolster elements having a coupling for connection of two of the slab bolster elements end to end comprising:

first and second slab bolster elements each having an injection molded frame defining a rail for supporting reinforcing bars laid across the rail and a plurality of legs for supporting the rail at a position spaced from a support surface so that a filler material laid on the support surface covers the reinforcing bars and the rails;

the rail having a top surface onto which the bars are laid and two side surfaces;

the frame of the first bolster element having a male coupling at one end for connection to a female coupling at an end of the frame of the second bolster element;

the male coupling comprising a blade projecting longitudinally of the rail for sliding into a female receptacle of the female coupling;

the first and second slab bolster elements having a locking mechanism which acts to lock the blade in the female receptacle to hold the first and second elements together in a connected position which is releasable to allow the elements to move apart;

the locking mechanism comprising a notch on one side surface of the blade of the first element and a projecting portion of the female coupling of the second element which is, in the connected position, engaged into the notch to hold the blade against movement away from the second element;

the projecting portion being carried by a flexible mounting on female coupling of the second element which can flex to cause the projecting portion to move in a direction away from the side surface of the blade out of the notch to allow the blade to move out of the female receptacle;

the female coupling of the second portion including a manually depressible member on a side of the female receptacle opposite the projecting portion which when depressed provides motion toward the female receptacle;

and the female coupling of the second portion including a connecting portion connecting the manually depressible member to the projecting portion so that said motion of the manually depressible member causes said projecting portion to move out of the notch.

2. The slab bolster elements according to claim 1 wherein said connecting portion extends underneath the blade.

3. The slab bolster elements according to claim 2 wherein said connecting portion is connected to the female receptacle on each side of the blade by a respective one of a pair of flexible arm portions.

4. The slab bolster elements according to claim 3 wherein said female receptacle includes a top wall, a bottom wall and two side walls defining an open mouth into which the blade is inserted and wherein each of said flexible arm portions extends alongside a respective one of the side walls of the female receptacle.

5. The slab bolster elements according to claim 4 wherein each of said flexible arm portions is connected to said respective one of the side walls of the female receptacle and is inclined outwardly therefrom to the respective side.

6. The slab bolster elements according to claim 4 wherein said top wall of the female receptacle is coplanar with the top surface of the rail.

7. The slab bolster elements according to claim 1 wherein said connecting portion is connected to the female receptacle on each side of the blade by a respective one of a pair of flexible arm portions.

8. The slab bolster elements according to claim 1 wherein said connecting portion comprises a bar extending across the blade from one side of the blade to the other.

9. The slab bolster elements according to claim 8 wherein said bar has an upper surface in sliding contact with the blade.

10. The slab bolster elements according to claim 1 wherein said frame of the first bolster element includes a first cross member across the rail of the first element at the male coupling with a leg at each end of the first cross member and wherein said frame of the second bolster element includes a second cross member across the rail at the female coupling with a leg at each end of the second cross member.

* * * * *